United States Patent [19]

Gregory et al.

[11] Patent Number: 4,764,178
[45] Date of Patent: Aug. 16, 1988

[54] THERMAL TRANSFER PRINTING: HETERO-AROMATIC AZO DYE

[75] Inventors: Peter Gregory, Bolton; Raymond L. White, Radcliffe, both of England

[73] Assignee: Imperial Chemical Industries PLC, London, England

[21] Appl. No.: 896,000

[22] Filed: Aug. 13, 1986

[30] Foreign Application Priority Data

Aug. 27, 1985 [GB] United Kingdom ............... 8521327

[51] Int. Cl.$^4$ .................... B41M 5/26; C09B 29/03; C09D 11/02
[52] U.S. Cl. ........................................ 8/471; 8/690; 8/691; 8/692; 8/922; 428/537.5; 428/913; 428/914; 503/227
[58] Field of Search .......................................... 8/471

[56] References Cited

U.S. PATENT DOCUMENTS

4,527,171  7/1985  Takanashi et al. ............ 346/76 PH

FOREIGN PATENT DOCUMENTS

| 30695 | 6/1981 | European Pat. Off. . |
| 30028 | 6/1981 | European Pat. Off. . |
| 60-30392 | 2/1985 | Japan . |
| 60-30394 | 2/1985 | Japan . |
| 60-239291 | 11/1985 | Japan . |
| 60-239292 | 11/1985 | Japan . |
| 61-12392 | 1/1986 | Japan . |
| 1504705 | 3/1978 | United Kingdom . |
| 1539513 | 1/1979 | United Kingdom . |
| 2036809 | 7/1980 | United Kingdom . |

OTHER PUBLICATIONS

Encyclopedia of Chemical Technology, Kirk-Othmer, 3rd Ed., vol. 8, p. 324.
Heat Transfer Printing, E. P. Dempsey et al., Interprint, pp. 20-21.
An Introduction to Textile Printing, W. Clarke, Newnes Butterworth, pp. 240-245.
J6 1227-091A Abstract of JP-068692 dtd Oct. 9, 1986.
J6 3005-992A Abstract of JP-149739 dtd Jan. 11, 1988.

Primary Examiner—A. Lionel Clingman
Attorney, Agent, or Firm—Cushman, Darby & Cushman

[57] ABSTRACT

A thermal transfer printing sheet comprising a substrate having a coating comprising at least one azo dye of the formula:

$$A{-}N{=}N{-}E \qquad \text{I}$$

wherein :

A is the residue of a diazotizable heteroaromatic amine, A—$NH_2$, in which A is selected from imidazolyl, pyrazolyl, thiazolyl, benzothiazolyl, isothiazolyl, benzoisothiazolyl, pyridoisothiazolyl and thienyl; and E is the residue of an aromatic coupling component, E—X wherein X is a group displaceable by a diazotized aromatic amine and E is optionally substituted aminophenyl, tetra- hydroquinolinyl, julolidyl or aminoquinolinyl, and a process for the transfer of dye from the transfer sheet to a receiver sheet by the selective application of heat to the transfer sheet while it is contact with the receiver sheet.

5 Claims, No Drawings

THERMAL TRANSFER PRINTING: HETERO-AROMATIC AZO DYE

This specification describes an invention relating to thermal transfer printing (TTP), especially to a transfer sheet carrying a dye or dye mixture, and to a transfer printing process in which dye is transferred from the transfer sheet to a receiver sheet by the application of heat.

In the form of thermal transfer printing with which the present application is concerned, a heat-transferable dye is applied to a sheet-like substrate, in the form of an ink, usually containing a polymeric or resinous binder to bind the dye to the substrate, to form a transfer sheet. This is then placed in contact with the material to be printed, the receiver sheet, and selectively heated in accordance with a pattern information signal whereby dye from the selectively heated regions of the transfer sheet is transferred to the receiver sheet and forms a pattern thereon the shape and density of which is in accordance with the pattern and intensity of heat applied to the transfer sheet.

Important criteria in the selection of a dye for TTP are its thermal properties, brightness of shade, fastness properties, such as light and heat fastness, and facility for application to the substrate in the preparation of the transfer sheet. For suitable performance the dye should transfer evenly, in a predetermined relationship to the heat applied to the transfer sheet so that the depth of shade on the receiver sheet is smoothly related to the heat applied and a good density gradation can be achieved on the receiver sheet. Brightness of shade is important in order to obtain as wide a range of shades with the three primary dye shades of yellow, cyan and magenta.

As the dye must be sufficiently mobile to migrate from the transfer sheet to the receiver sheet at the temperatures employed, from 150°–400° C., it is generally free from ionic and water-solubilising groups, and is thus not readily soluble in aqueous or water-miscible media, such as water and alkanols. Many suitable dyes are also not readily soluble in the solvents which are commonly used in, and thus acceptable to, the printing industry, such as aromatic hydrocarbons, alkanols and alkyl- and cycloalkyl-ketones. Although the dye can be applied as a dispersion in a suitable solvent, it has been found that brighter, glossier and smoother final prints can often be achieved on the receiver sheet if the dye is applied to the substrate from a solution. To apply sufficient dye to the transfer sheet, and thereby to achieve the potential for a deep shade on the receiver sheet, it is desirable that the dye should be readily soluble in the ink medium, particularly if it has a relatively low extinction coefficient. It is also important that a dye which has been applied to a transfer sheet from a solution should be resistant to crystallisation so that it remains as an amorphous layer on the transfer sheet for a considerable time.

According to a first aspect of the present invention there is provided a thermal transfer printing sheet comprising a substrate having a coating comprising at least one azo dye of the formula:

$$A-N=N-E \qquad \text{I}$$

wherein:
A is the residue of a diazotisable heteroaromatic amine, $A-NH_2$, in which A is selected from imidazolyl, pyrazolyl, thiazolyl, benzothiazolyl, isothiazolyl, benzoisothiazolyl, pyridoisothiazolyl and thienyl; and E is the residue of an aromatic coupling component, E—X wherein X is a group displaceable by a diazotised aromatic amine and E is optionally substituted aminophenyl, tetrahydroquinolinyl, julolidyl or aminoquinolinyl.

The residue, A, of the heteroaromatic amine, $A-NH_2$, may be substituted by non-ionic groups, preferably those which are free from acidic hydrogen atoms unless these are positioned so that they form intramolecular hydrogen bonds. Examples of suitable substituents are cyano; thiocyano; nitro; halo, such as fluoro, chloro and bromo; $C_{1-4}$-alkyl; $C_{1-4}$-alkoxy; $C_{1-4}$-alkoxy- and cyano-$C_{1-4}$-alkyl; formyl (—CHO); $C_{1-4}$-alkyl-thio and sulphonyl; trifluoromethyl; mono- and di-($C_{1-4}$alkyl)amino-carbonyl and sulphonyl; amino-, fluoro- and chlorosulphonyl and carbonyl; and $C_{1-4}$-alkoxy- and $C_{1-4}$-alkyl-carbonyl. Especially preferred substituents are cyano, thiocyano, cyanomethyl, nitro and methyl.

Examples of heteroaromatic residues represented by A are:
4,5-dicyano-imidazol-2-yl
1-ethyl-4,5-dicyano-imidazol-2-yl
1-cyanomethyl-4,5-dicyano-imidazol-2-yl
1-ethyl-3,4-dicyano-pyrazol-5-yl
3-cyanomethyl-4-cyano-pyrazol-5-yl
1-cyanomethyl-3,4-dicyano-pyrazol-5-yl
1,3-di(cyanomethyl)-4-cyano-pyrazol-5-yl
5-nitro-thiazol-2-yl
6-nitro-benzothiazol-2-yl
6-chloro-benzothiazol-2-yl
6-methoxy-benzothiazol-2-yl
4,6-dibromo-benzothiazol-2-yl
6-thiocyano-benzothiazol-2-yl
6-fluorosulphonyl-benzothiazol-2-yl
6-methylsulphonyl-benzothiazol-2-yl
5,6- and 6,7-dichloro-benzothiazol-2-yl
4-cyano-isothiazol-5-yl
3-methyl-4-cyano-isothiazol-5-yl
5-nitro-2,1-benzoisothiazol-3-yl
5-nitro-7-bromo-2,1-benzoisothiazol-3-yl
pyrido[2,3-c]isothiazol-3-yl
6-cyano-pyrido[2,3-c]isothiazol-3-yl
6-nitro-pyrido[2,3-c]isothiazol-3-yl
5-methyl-6-cyano-pyrido[2,3-c]isothiazol-3-yl
5-methoxy-6-cyano-pyrido[2,3-c]isothiazol-1-yl
3,5-dinitro-thien-2-yl
3,5-dicyano-thien-2-yl
3-cyano-5-nitro-thien-2-yl
3-formyl-5-nitro-thien-2-yl
3-carboxy-5-nitro-thien-2-yl.

Especially preferred residues represented by A are:
1-cyanomethyl-3,4-dicyanopyrazol-5-yl;
4-cyanoisothiazol-5-yl;
3-methyl-4-cyano-isothiazol-5-yl;
pyrido[2,3-c]isothiazol-3-yl, optionally substituted in the 5 and/or 6 positions by a group selected from cyano, nitro, methyl and methoxy; and
thien-2-yl, substituted in the 3 and 5 positions by a one or more groups selected from cyano, nitro, methylaminocarbonyl and optionally substituted in the 4 position by methyl or methoxy.

The coupler is preferably of the formula, E—H in which the displaceable group, X, is hydrogen. E is preferably selected from optionally substituted 4-aminophenyl, 8-aminoquinolin-5-yl and 1,2,3,4-tetrahydroquinolin-6-yl.

Examples of optional ring substituents are $C_{1-4}$-alkyl; $C_{1-4}$-alkoxy; $C_{1-4}$-alkyaminocarbonyl; $C_{1-4}$-alkylcarbonylamino; halo, such as bromo and chloro; $C_{1-4}$-alkylcarbonyloxy-$C_{1-4}$-alkyl; $C_{1-4}$-alkoxy-$C_{1-4}$-alkyl; cyano-$C_{1-4}$-alkyl; cyano; $C_{1-4}$-alkylcarbonyl; $C_{1-4}$-alkoxycarbonyl and $C_{1-4}$-alkylaminosulphonyl; especially $C_{1-4}$-alkyl, $C_{1-4}$-alkylcarbonylamino and chloro. Examples of substituents for the amino group on the coupling component are $C_{1-6}$-alkyl; phenyl; and substituted $C_{1-4}$-alkyl in which the substituents are selected from cyano, hydroxy, chloro, $C_{1-4}$-alkylcarbonyloxy, $C_{1-4}$-alkoxy, phenyl, $C_{1-4}$-alkoxycarbonyl and succinamido.

It is preferred that E has the formula:

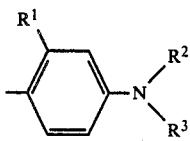

II wherein $R^1$ is selected from H, chloro, $C_{1-4}$-alkyl, $C_{1-4}$-alkylcarbonylamino; and $R^2$ and $R^3$ are selected from H; $C_{1-4}$-alkyl and $C_{1-4}$-alkyl substituted by a group selected from $C_{1-4}$-alkoxy, $C_{1-4}$-alkoxycarbonyl, $C_{1-4}$-alkylcarbonyloxy, cyano and chloro.

It is more especially preferred that in Formula II, $R^1$ is selected from H, chloro, methyl or acetylamino and $R^2$ and $R^3$ are selected from $C_{2-4}$-alkyl, especially ethyl and n-butyl; $C_{1-4}$-alkoxy-$C_{1-4}$-alkyl, especially ethoxyethyl; $C_{1-4}$-alkoxycarbonyl-$C_{1-4}$-alkyl, especially 2-(methoxycarbonyl)ethyl and 2-(ethoxycarbonyl)ethyl; $C_{1-4}$-alkylcarbonyloxy-$C_{1-4}$-alkyl, especially 2-acetoxyethyl and 2-cyanoethyl.

Examples of coupling components represented by E—H are:
3-methylaniline
N,N-dimethyl- and N,N-diethyl-aniline
3-methyl-N,N-diethylaniline
3-chloro-N,N-diethylaniline
3-methoxy-N,N-dietylaniline
N-ethyl-N-(2-ethoxyethyl)aniline
3-methyl-N,N-di(n-propyl)aniline
3-acetylamino-N,N-diethylaniline
3-methyl-N-benzyl-N-ethylaniline
3-methyl-N-n-butyl-N-ethylaniline
N-phenyl-N-(2-acetoxyethyl)aniline
3-methyl-N-sec-butyl-N-ethylaniline
N-ethyl-N-(2-succinamidoethyl)aniline
3-acetylamino-N-ethyl-N-n-butylaniline
3-methyl-N,N-di(2-acetoxyethyl)aniline
3-methyl-N-ethyl-N-[cyanoethyl]aniline
N-methyl-N-(methoxycarbonylethyl)aniline  3-benzoylamino-N,N-di(acetoxyethyl)aniline
3-acetylamino-6-methoxy-N,N-diethylaniline
3,6-dimethoxy-N-(1,2-dimethyl-n-propyl)aniline
3-methyl-N-n-butyl-N-(2-ethoxycarbonylethyl)aniline
3-methyl-N-n-butyl-N-[2-(ethoxycarbonyl)ethyl]aniline
3-methyl-N-n-butyl-N-[3-(ethoxycarbonyl)propyl]aniline
3-methyl-N-ethyl-N-(2-hydroxy-3-chloro-n-propyl)aniline
3-methyl-N-n-butyl-N-(3-methoxycarbonyl-n-propyl)aniline juloidine
1-acetoxyethyl-2,2,4,7-tetramethyl-1,2,3,4-tetrahydroquinoline.

A preferred dye conforms to the formula:

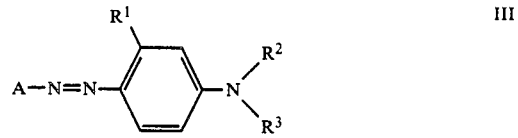

III wherein

A is selected from:
4-cyanoisothiazol-5-yl;
3-methyl-4-cyanisothiazol-5-yl;
1-cyanomethyl-3,4-dicyanopyrazol-5-yl;
pyrido[2,3-c]isothiazol-3-yl, optionally substituted in the 5 and/or 6 positions by a group selected from cyano, nitro, methyl and methoxy; and
thien-2-yl, substituted in the 3 and 5 positions by a group selected from cyano, nitro, methylaminocarbonyl and optionally substituted in the 4 position by methyl or methoxy;

$R^1$ is selected from H, $C_{1-4}$-alkyl, $C_{1-4}$-alkylcarbonylamino; and $R^2$ and $R^3$ are selected from H; $C_{1-4}$-alkyl and $C_{1-4}$-alkyl substituted by a group selected from $C_{1-4}$-alkoxy, $C_{1-4}$-alkoxycarbonyl, $C_{1-}$-alkylcarbonyloxy, cyano and chloro.

In an especially preferred dye of Formula III:
A is selected from 4-cyanoisothiazol-5-yl, 3-methyl-4-cyanoisothiazol-5-yl and 1-cyanomethyl-3,4-dicyanopryazol-5-yl;
$R^1$ is selected from H, methyl and acetylamino; and
$R^2$ and $R^3$ are selected from $C_{2-4}$-alkyl, especially ethyl and n-butyl; $C_{1-4}$-alkoxy-$C_{1-4}$-alkyl, especially ethoxyethyl; $C_{1-4}$-alkoxycarbonyl-$C_{1-4}$-alkyl, especially 2-(methoxycarbonyl)- and 2-(ethoxycarbonyl)-ethyl; $C_{1-4}$-alkylcarbonyloxy-$C_{1-4}$-alkyl, especially 2-acetoxyethyl; and 2-cyanoethyl.

Specific examples of suitable dyes of Formula I are:
3-methyl-4-(3-cyanomethyl-4,5-dicyanoimidazol-2-ylazo)-N-n-butyl-N-(3-[methoxycarbonyl]-propyl)-aniline
3-methyl-4-(1-cyanomethyl-3,4-dicyanopyrazol-5-ylazo)-N-n-butyl-N-2-(ethoxycarbonyl)ethylaniline
3-methyl-4-(1-cyanomethyl-3,4-dicyanopyrazol-5-ylazo)-N-n-butyl-N-ethylaniline
3-acetylamino-4-(1-cyanomethyl-3,4-dicyanopyrazol-5-ylazo)-N-n-butyl-N-ethylaniline
3-methyl-4-(1-cyanomethyl-3,4-dicyanopyrazol-5-ylazo)-N,N-diethylaniline
3-methyl-4-(6-thiocyanobenzothiazol-2-ylazo)-N,N-diethylaniline,
3-methyl-4-(6-thiocyanobenzothiazol-2-ylazo)-N,N-di(2-acetoxyethyl)aniline,
3-methyl-4-(6-thiocyanobenzothiazol-2-ylazo)-N-ethyl-N-sec-butylaniline
3-methyl-4-(3-methyl-4-cyanoisothiazol-5-ylazo)-N,N-diethyl-aniline
4-(3-methyl-4-cyanoisothiazol-5-ylazo)-N,N-diethylaniline
4-(3-methyl-4-cyanoisothiazol-5-ylazo)-N-ethyl-N-(2-ethoxyethyl)aniline 3-methyl-4-(3-methyl-4-cyanoisothiazol-5-ylazo)-N,N-di(2-acetoxyethyl)aniline 3-methyl-4-(3-methyl-4-cyanoisothiazol-5-ylazo)-N-n-butyl-N-(2-[ethoxy-carbonyl]ethyl)aniline 3-methyl-4-(3-methyl-4-cyanoisothiazol-5-ylazo)-N-ethyl-N-(2-[ethoxycarbonyl]ethyl)aniline 3-methyl-4-(3-methyl-4-cyanoisothiazol-5-ylazo)-N-ethyl-N-(2-ethoxyethyl)aniline 3-methyl-4-(5-nitrobenzoisothiazol-3-ylazo)-N,N-diethylaniline 3-methyl-4-(5-cyano-6-methylpryidoisothiazol-3-ylazo)-N,N-di(n-propyl)aniline 3-methyl-4-(5-nitropyridoisothiazol-3-yl-azo)-N,N-diethylaniline 3-methyl-4-(3,5-dinitrothien-2-ylazo)-N,N-diethylaniline 3-methyl-4-(3,5-dicyano-4-methylthien-2-ylazo)-N,N-di(2-acetoxyethyl)-aniline.

Intermediate shades and enhanced tinctorial strength may be achieved by the use of mixtures of dyes. Such mixtures may consist wholly of different dyes of Formula I or of one or more dyes of Formula I with other dyes, preferably such other dyes having similar thermal and/or coloristic properties.

The dye of Formula I has good thermal properties giving rise to even prints on the receiver sheet, whose depth of shade is related to the quantity of applied heat so that a good gradation of colour density can be obtained.

The dye of Formula I has strong coloristic properties and good solubility in a wide range of solvents, especially those solvents which are widely used and accepted in the printing industry, such as alkanols, e.g. ethanol, isopropanol and butanol, aromatic hydrocarbons, such as toluene and ketones such as MEK, MIBK and cyclohexanone. This facilitates the application of the dye to the substrate from a solution and thus aids in the achievement of bright, glossy prints on the receiver sheet. The combination of strong coloristic properties and good solubility in the preferred solvents allows the achievement of deep and even shades.

The substrate may be any convenient sheet material capable of withstanding the temperatures involved in TTP, up to 400° C. over a period of up to 20 milliseconds (msec), yet thin enough to transmit heat applied on one side through to the dye on the other side to effect transfer to a receiver sheet within such short periods, typically from 1 to 10 msec. Examples of suitable materials are paper, especially high quality paper of even thickness such as capacitor paper; polyester; polacrylate; polyamide; cellulosic and polyalkylene films; metallised forms thereof, including co-polymer and laminated films, especially laminates incorporating a polyester layer on which the dye is deposited. Such laminates preferably comprise, in addition to the polyester, a backcoat of a heat-resistant material, such as a thermosetting resin, e.g. silicone or polyurethane, to separate the heat source from the polyester so that the latter is not melted. The thickness of the substrate may vary within wide limits depending upon its thermal characteristics but is preferably less that 50 μm and more preferably below 10 μm.

The coating preferably comprises a binder and one or more dyes of Formula I. The ratio of binder to dye is preferably at least 1:1 and more preferably from 1.5:1 to 4:1 in order to provide good adhesion between the dye and the substrate and inhibit migration of the dye during storage.

The binder may be any resinous or polymeric material suitable for binding the dye to the substrate. Examples of suitable binders are cellulose derivatives, such as ethylhydroxyethylcellulose (EHEC), especially the commercially low and extra-low viscosity grades of EHEC hereinafter referred to as EHEC-lv and EHEC-elv, hydroxpropylcellulose (HPC), ethylcellulose, methyl-cellulose, cellulose acetate and cellulose acetate butyrate; carbohydrate derivatives, such as starch; alginic acid derivatives; alkyd resins; vinyl resins and derivatives, such as polyvinyl alcohol, polyvinyl acetate, polyvinyl butyral and polyvinyl pyrrolidone; polymers and co-polymers derived from acrylates and acrylate derivatives, such as polyacrylic acid, polymethyl methyacrylate and styrene-acrylate copolymers, polyester resins, polyamide resins, such as melamines; polyurea and polyurethane resins; organosilicones, such as polysiloxanes, epoxy resins and natural resins, such as gum tragacanth and gum arabic.

The coating may also contain other additives, such as curing agents, preservatives, etc., these and other ingredients being described more fully in EP No. 133011A, EP No. 133012A and EP No. 111004A.

According to a further feature of the present invention there is provided a transfer printing process which comprises contacting a transfer sheet coated with a dye of Formula I with a receiver sheet, so that the dye is adjacent to the receiver sheet, and selectively heating areas of the transfer sheet whereby dye in the heated areas of the transfer sheet may be selectively transferred to the receiver sheet.

The receiver sheet conveniently comprises a white polyester sheet material, preferably having a receptive coating layer on the side to which the dye is applied.

The invention is further illustrated by the following examples in which all parts are by weight unless otherwise indicated.

Table 1 lists dyes of Formula I suitable for use in the present invention. In Table 1:

A1 is imidazol-2-yl of the formula:

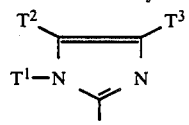

A2 is pyrazol-5-yl of the formula:

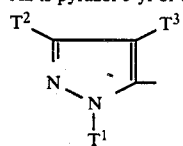

A3 is thiazol-2-yl of the formula:

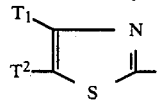

A4 is benzothiazol-2-yl of the formula:

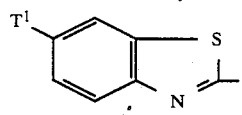

A5 is isothiazolo-5-yl of the formula:

-continued

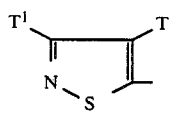

A6 is benzoisothiazol-3-yl of the formula:

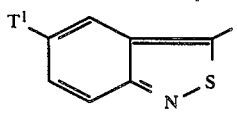

A7 is pyridoisothiazol-3-yl of the formula:

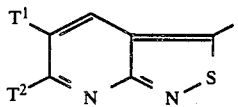

A8 is thien-2-yl of the formula:

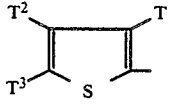

E1 is 4-aminophenyl of the formula:

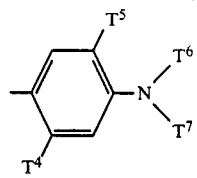

E2 is 1,2,3,4-tetrahydroquinolin-6-yl of the formula:

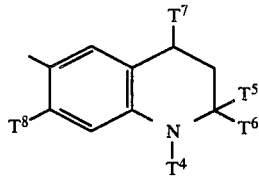

E3 is julolidyl of the formula:

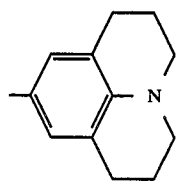

TABLE 1

| Dye | Diazo Component | | | | Coupling Component | | | | |
|---|---|---|---|---|---|---|---|---|---|
| | A | $T^1$ | $T^2$ | $T^3$ | E | $T^4$ | $T^5$ | $T^6$ | $T^7$ | $T^8$ |
| 1 | A1 | CM | —CN | —CN | E1 | Me | H | n-Bu | MCnP | — |
| 2 | A2 | CM | —CN | —CN | E1 | Me | H | Et | Et | — |
| 3 | A2 | CM | —CN | —CN | E1 | Me | H | n-Bu | ECE | — |
| 4 | A2 | CM | —CN | —CN | E3 | — | — | — | — | — |
| 5 | A2 | CM | —CN | —CN | E1 | H | H | Et | Et | — |
| 6 | A2 | CM | —CN | —CN | E1 | Me | H | Et | EOE | — |
| 7 | A2 | CM | CM | —CN | E1 | Me | H | Et | Et | — |
| 8 | A2 | Et | CM | —CN | E1 | Me | H | Et | Et | — |
| 9 | A2 | Et | CM | —CN | E1 | AA | H | Et | Et | — |
| 10 | A2 | CM | —CN | —CN | E1 | AA | H | Et | Et | — |
| 11 | A2 | CM | —CN | —CN | E1 | AA | H | Et | n-Bu | — |
| 12 | A2 | CM | —CN | —CN | E1 | Me | H | Et | n-Bu | — |
| 13 | A2 | CM | —CN | —CN | E1 | MO | H | Et | Et | — |
| 14 | A3 | H | —NO₂ | — | E1 | Me | H | Et | Et | — |
| 15 | A3 | H | —NO₂ | — | E1 | Me | H | Et | HCnP | — |
| 16 | A4 | —SCN | — | — | E1 | Me | H | Et | Et | — |
| 17 | A4 | —SCN | — | — | E1 | H | H | Me | Bz | — |
| 18 | A4 | —SCN | — | — | E1 | Me | H | H | H | — |
| 19 | A4 | —SCN | — | — | E1 | H | H | Et | CE | — |
| 20 | A4 | —SCN | — | — | E1 | H | H | Et | AE | — |
| 21 | A4 | —SCN | — | — | E1 | Me | H | Et | AE | — |
| 22 | A4 | —SCN | — | — | E2 | AE | Me | Me | Me | Me |
| 23 | A4 | —SCN | — | — | E1 | H | H | Ph | AE | — |
| 24 | A4 | —SCN | — | — | E1 | Me | H | Et | s-Bu | — |
| 25 | A4 | —SCN | — | — | E1 | Me | H | Et | EOE | — |
| 26 | A4 | —SCN | — | — | E1 | Me | H | AE | AE | — |
| 27 | A5 | Me | —CN | — | E1 | Me | H | Et | Et | — |
| 28 | A5 | Me | —CN | — | E1 | H | H | Et | Et | — |
| 29 | A5 | Me | —CN | — | E1 | H | H | Et | EOE | — |
| 30 | A5 | Me | —CN | — | E1 | H | H | Me | Me | — |
| 31 | A5 | Me | —CN | — | E1 | Me | H | AE | AE | — |
| 32 | A5 | Me | —CN | — | E1 | Me | H | n-Bu | ECE | — |
| 33 | A5 | Me | —CN | — | E1 | Me | H | Et | ECE | — |
| 34 | A5 | Me | —CN | — | E1 | Me | H | Et | EOE | — |
| 35 | A5 | Me | —CN | — | E1 | Me | H | Et | AE | — |
| 36 | A5 | Me | —CN | — | E1 | Me | H | AE | EOE | — |
| 37 | A5 | Me | —CN | — | E1 | Cl | H | Et | Et | — |
| 38 | A6 | —NO₂ | — | — | E1 | Me | H | Et | Et | — |
| 39 | A6 | —CN | — | — | E1 | AA | H | Et | Et | — |
| 40 | A7 | —NO₂ | H | — | E1 | Me | H | Et | Et | — |
| 41 | A7 | —CN | Me | — | E1 | Me | H | n-Pr | n-Pr | — |
| 42 | A7 | —CN | Me | — | E1 | MO | MO | H | DMnP | — |
| 43 | A8 | —NO₂ | H | —NO₂ | E1 | Me | H | AE | AE | — |
| 44 | A8 | —NO₂ | H | —NO₂ | E1 | Me | H | Et | Et | — |
| 45 | A8 | —NO₂ | H | —NO₂ | E1 | Me | H | Et | Bz | — |
| 46 | A8 | —NO₂ | H | —NO₂ | E1 | AA | H | Et | Et | — |
| 47 | A8 | EC | H | —NO₂ | E1 | AA | H | Et | Et | — |

TABLE 1-continued

| | | | | | | | | | | |
|---|---|---|---|---|---|---|---|---|---|---|
| 48 | A8 | —NO$_2$ | H | —NO$_2$ | E1 | H | H | MCE | MCE | — |
| 49 | A8 | —NO$_2$ | H | —NO$_2$ | E1 | H | H | n-BCE | n-BCe | — |
| 50 | A8 | —NO$_2$ | H | —NO$_2$ | E1 | Me | H | n-PCE | n-PCE | — |
| 51 | A8 | —NO$_2$ | H | —NO$_2$ | E1 | H | H | Et | Bz | — |
| 52 | A8 | —CN | H | —NO$_2$ | E1 | H | H | Et | Bz | — |
| 53 | A8 | EC | H | —NO$_2$ | E1 | Me | H | Et | HE | — |
| 54 | A8 | —CN | Me | —CN | E1 | AA | MO | Et | Et | — |
| 55 | A8 | —CN | H | —NO$_2$ | E1 | AA | H | Et | Et | — |
| 56 | A8 | —CN | H | —NO$_2$ | E1 | Me | H | Et | Et | — |
| 57 | A8 | —CN | H | —NO$_2$ | E1 | Me | H | Et | Bz | — |
| 58 | A8 | MAC | H | —NO$_2$ | E1 | Me | H | Et | Et | — |
| 59 | A8 | —CN | Me | —CN | E1 | Me | H | AE | AE | — |
| 60 | A8 | —CN | Me | —CN | E1 | H | H | CE | CE | — |
| 61 | A8 | —CN | Me | —CN | E1 | H | H | CE | AE | — |
| 62 | A8 | —CN | Me | —CN | E1 | CN | H | Et | Et | — |

Notes to Table 1
The abbreviations in Table 1 have the following meanings:

| | | | | | |
|---|---|---|---|---|---|
| AA | acetylamino | s-Bu | sec-butyl | Bz | benzyl |
| CE | 2-cyanoethyl | CM | cyanomethyl | Et | ethyl |
| Me | methyl | EOE | ethoxyethyl | MO | methoxy |
| Ph | phenyl | n-Bu | n-butyl | n-Pr | n-propyl |
| DMnP | 1,2-dimethyl-n-propyl | | ECE | 2(ethoxycarbonyl)-ethyl | |
| HCnP | 2-hydroxy-3-chloro-n-propyl | | AE | 2-acetoxyethyl | |
| MAC | methylaminocarbonyl | | MCnP | 3(methoxycarbonyl)-n-propyl | |
| EC | ethoxycarbonyl | | MCE | 2(methoxycarbonyl)-ethyl | |
| HE | 2-hydroxyethyl | | n-BCE | 2(n-butoxycarbonyl)-ethyl | |
| | | | n-PCE | 2(n-propoxycarbonyl)-ethyl | |

INKS 1 TO 62

Inks were prepared by dissolving 0.1 g of each of Dyes 1 to 62 in 5.0 ml of chloroform and adding 9.5 ml of a 2.7% solution of EHEC-elv in chloroform. Each ink was stirred until it was homogeneous.

INK 63

A solution of 1 g of Dye 16 in a mixture of 29 g of toluene 20 g of cyclohexanone and 40 g of MEK was prepared by stirring the ingredients at 40° C. for 10 minutes after which 10 g of a 20% solution of EHEC-elv in toluene was added and the ink cooled to ambient temperature.

INK 64

A solution of 2 g of Dye 26 in a mixture of 58 g of MEK and 20 g of cyclohexanone was prepared by stirring the ingredients at 40° C. for 10 minutes after which 20 g of a 20% solution of EHEC-elv in MEK was added and the ink cooled to ambient temperature.

INK 65

A solution of 1.0 g of Dye 27 in 89 g of cyclohexanone was prepared by stirring the ingredients at 40° C. for 10 minutes after which 20 g of a 20% solution of EHEC-elv in cyclohexanone was added and the ink cooled to ambient temperature.

INK 66

A solution of 2.0 g of Dye 27 in 47 g of cyclohexanone and 11 g of MEK was prepared by stirring the ingredients at 40° C. for 10 minutes after which 40 g of a 10% solution of EHEC-elv in MEK was added and the ink cooled to ambient temperature.

INK 67

A solution of 1.0 g of Dye 17 in 20 g of cyclohexanone, 19 g of toluene and 40 g of MEK was prepared by stirring the ingredients at 40° C. for 10 minutes after which 20 g of a 10% solution of EHEC-elv in toluene was added and the ink cooled to ambient temperature.

INK 68

Prepared as for Ink 67 except 1.0 of Dye 19 was used instead of Dye 17.

INK 69

Prepared as for Ink 67 except that 1.0 g of Dye 20 was used instead of Dye 17.

INK 70

A solution of 2.0 g of Dye 24 was prepared by dissolving the dye and 4.0 g EHEC-elv in 36 g MEK, 22 g of cyclohexanone and 3.6 g toluene by stirring the ingredients at 40° C. for 10 minutes and cooling to ambient temperature.

INK 71

A solution of 0.5 g of Dye 16 and 0.5 g of Dye 17 in 20 g cyclohexanone, 29 g of toluene and 40 g of MEK was prepared by stirring the ingredients at 40° C. for 10 minutes, after which time 10 g of a 20% solution of EHEC-elv in toluene was added and the ink cooled to amibent temperature.

INK 72

A solution of 1.0 g of Dye 28 was prepared by adding the dye and 2.0 g EHEC-elv to 48.5 g of MEK and 48.5 g of cyanohexanone and by stirring the ingredients at 40° C. for 10 minutes and then cooling to ambient temperature.

INK 73

Prepared as for Ink 72 except EHEC high viscosity grade used instead of EHEC-elv.

INK 74

A solution of 2.0 g of Dye 32 was prepared by adding the dye and 4.0 g of EHEC-elv to 47 g of MEK and 47 g of cyclohexanone and stirring the ingredients at 40° C. for 10 minutes, and then cooling to ambient temperature.

INK 75

A solution of 2.0 g of Dye 31 was prepared by adding the dye and 4.0 g of EHEC-elv to 47 g of MEK and 47 g of cyclohexanone and stirring the ingredients at 40° C. for 10 minutes, and then cooling to ambient temperature.

INK 76

Prepared as for Ink 75 except that 2.0 g of Dye 34 was used instead of Dye 31.

INK 77

A solution of 1.5 g of Dye 2 was prepared by dissolving the dye and 3.0 g of EHEC-elv in 47.75 g of MEK and 47.75 g of cyclohexanone and stirring the ingredients at 40° C. for 10 minutes, and then cooling to ambient temperature.

INK 78

A solution of 1.0 g of Dye 12 was prepared by dissolving the dye and 2.0 g of EHEC-elv in 48.5 g of MEK and 48.5 g of cyclohexanone and stirring the ingredients at 40° C. for 10 minutes, then cooling to ambient temperature.

INKS 79 TO 83

Five inks were prepared using Dye 2 and Dye 27 in the proportions indicated in the following table. Each ink contained 2% total dye, 4% EHEC-elv, 47% MEK and 47% cyclohexanone.

| Ink    | 79 | 80 | 81 | 82 | 83 |
|--------|----|----|----|----|----|
| Dye 2  | 4  | 3  | 2  | 1  | 0  |
| Dye 27 | 0  | 1  | 2  | 3  | 4  |

The solid ingredients were dissolved in the mixed solvents, stirred at 40° C. for 10 minutes and cooled to ambient temperature.

EXAMPLE 1

A transfer sheet was prepared by applying Ink 1 to a sheet of 6μ thick polyethylene terephthalate using a wire-wound metal Meyer-bar to produce a 24 micron wet film of ink on the surface of the sheet. The ink was dried with hot air and the sheet is hereinafter referred to as TS 1.

EXAMPLES 2 TO 83

Transfer sheets, hereinafter referred to as TS 2 and TS 83, were prepared by the method of Example 1 using Ink 2 to Ink 83, respectively, in place of Ink 1.

EXAMPLE 84

A sample of TS 1 was sandwiched with a receiver sheet, comprising a composite structure based in a white polyester base having a receptive coating layer on the side in contact with the printed surface of TS1. The sandwich was placed on the drum of a transfer printing machine and passed over a matrix of closely-spaced pixels, Thermal Head KMT-85 (6 dots/mm), which were selectively heated in accordance with a pattern information signal to a temperature of >300° C. for periods from 2 to 10 msec, whereby dye at the position on the transfer sheet in contact with a pixel while it was hot was transferred from the transfer sheet to the receiver sheet. After passage over the array of pixels the transfer sheet was separated from the receiver sheet The printed receiver sheet is hereinafter referred to as RS 1.

EXAMPLES 85 AND 166

Printed receiver sheets, hereinafter referred to as RS 2 to RS 83 respectively were prepared according to the method of Example 84 using TS 2 to TS 83, respectively, in place of TS 1.

ASSESSMENT OF INKS AND TRANSFER AND RECEIVER SHEETS

The stability of each ink and the quality of the print on the transfer sheet was assessed by visual inspection and the quality of the printed impression on the receiver sheet was assessed in respect of reflection density of colour by means of a densitometer (Sakura Digital densitometer). The results of the assessments are set out in Tables 2 and 3.

TABLE 2

| Ink | Dye | OD   | Ink | Dye | OD   |
|-----|-----|------|-----|-----|------|
| 1   | 1   | 0.76 | 32  | 32  | 1.45 |
| 2   | 2   | 0.90 | 33  | 33  | 1.37 |
| 3   | 3   | 1.20 | 34  | 34  | 1.59 |
| 4   | 4   | 1.17 | 35  | 35  | 1.49 |
| 5   | 5   | 1.12 | 36  | 36  | 1.34 |
| 6   | 6   | 1.01 | 37  | 37  | 1.47 |
| 7   | 7   | 0.84 | 38  | 38  | 1.34 |
| 8   | 8   | 0.79 | 39  | 39  | 1.15 |
| 9   | 9   | 0.92 | 40  | 40  | 1.15 |
| 10  | 10  | 0.60 | 41  | 41  | 0.90 |
| 11  | 11  | 1.45 | 42  | 42  | 1.01 |
| 12  | 12  | 1.77 | 43  | 43  | 1.45 |
| 13  | 13  | 0.77 | 44  | 44  | 1.10 |
| 14  | 14  | 0.90 | 45  | 45  | 1.60 |
| 15  | 15  | 0.70 | 46  | 46  | 1.79 |
| 16  | 16  | 1.46 | 47  | 47  | 1.50 |
| 17  | 17  | 1.43 | 48  | 48  | 1.40 |
| 18  | 18  | 0.56 | 49  | 59  | 1.18 |
| 19  | 19  | 0.90 | 50  | 50  | 1.13 |
| 20  | 20  | 1.38 | 51  | 51  | 1.87 |
| 21  | 21  | 1.54 | 52  | 52  | 1.43 |
| 22  | 22  | 1.34 | 53  | 53  | 1.36 |
| 23  | 23  | 0.94 | 54  | 54  | 1.30 |
| 24  | 24  | 1.00 | 55  | 55  | 1.51 |
| 25  | 25  | 1.80 | 56  | 56  | 1.40 |
| 26  | 26  | 1.10 | 57  | 57  | 1.49 |
| 27  | 27  | 1.50 | 58  | 58  | 1.00 |
| 28  | 28  | 1.89 | 59  | 59  | 1.40 |
| 29  | 29  | 1.59 | 60  | 60  | 1.45 |
| 30  | 30  | 1.88 | 61  | 61  | 1.40 |
| 31  | 31  | 1.23 | 62  | 62  | (1.6)|

TABLE 3

| Ink | TS | RS | Stability of Ink | Presence of Crystals on TS | Colour Density of RS |
|-----|----|----|----|----|----|
| 63 | 63 | 63 | good | none   | 2.0 |
| 64 | 64 | 64 | good | none   | 1.8 |
| 65 | 65 | 65 | good | slight | 1.9 |
| 66 | 66 | 66 | good | some   | 2.5 |
| 67 | 67 | 67 | good | some   | 1.8 |
| 68 | 68 | 68 | good | some   | 1.3 |
| 69 | 69 | 69 | good | some   | 1.8 |
| 70 | 70 | 70 | good | none   | 1.3 |
| 71 | 71 | 71 | good | slight | 1.9 |
| 72 | 72 | 72 | good | slight | 1.8 |
| 73 | 73 | 73 | good | slight | 1.7 |
| 74 | 74 | 74 | good | slight | 1.9 |
| 75 | 75 | 75 | good | some   | 1.8 |
| 76 | 76 | 76 | good | trace  | 2.1 |
| 77 | 77 | 77 | good | none   | 1.7 |
| 78 | 78 | 78 | good | none   | 1.8 |
| 79 | 79 | 79 | good | none   | 1.0 |
| 80 | 80 | 80 | good | none   | 2.0 |
| 81 | 81 | 81 | good | none   | 2.3 |

TABLE 3-continued

| Ink | TS | RS | Stability of Ink | Presence of Crystals on TS | Colour Density of RS |
|---|---|---|---|---|---|
| 82 | 82 | 82 | good | slight | 2.1 |
| 83 | 83 | 83 | acceptable | some | 2.5 |

We claim:

1. A thermal transfer printing sheet comprising a substrate having a coating comprising at least one azo dye of the formula:

$$A-N=N-E \qquad I$$

wherein:

A is the residue of a diazotisable heteroaromatic amine, A—$NH_2$, in which A is selected from imidazolyl, pyrazolyl, isothiazolyl, pyridoisothiazolyl and thienyl, substituted by groups selected only from cyano, thiocyano, nitro, halogen, $C_{1-4}$-alkoxy, formyl, cyano-$C_{1-4}$-alkyl, $C_{1-4}$-alkylsulphonyl, trifluoromethyl, fluorosulphonyl, $C_{1-4}$-alkylcarbonyl and $C_{1-4}$-alkoxycarbonyl;
and E is a group of the formula:

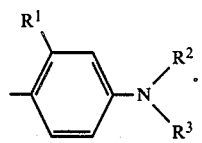

wherein $R^1$ is selected from H, chloro, $C_{1-4}$-alkyl and $C_{1-4}$-alkylcarbonylamino; and $R^2$ and $R^3$ are selected from H, $C_{1-4}$-alkyl and $C_{1-4}$-alkyl, substituted by a group selected from phenyl chloro, cyano, $C_{1-4}$-alkoxy, $C_{1-4}$-alkoxycarbonyl and $C_{1-4}$-alkycarbonyloxy.

2. A thermal transfer printing sheet according to claim 1 wherein A, is selected form 1-cyanomethyl-4-5-dicyanoimidazol-2-yl; 4-cyanoisothiazol-5-yl; 3-methyl-4-cyanoisothiazol-5-yl; 1-cyanomethyl-3,4-dicyanopyrazol-5-yl; pyrido-(2-,3-c)-isothiazol-3-yl substituted in the 5, 6 or 5 and 6 positions by a group selected from cyano, nitro, methyl and methoxy; and thien-2-yl, substituted in the 3, 5 or 3 and 5 positions by a group selected from cyano, nitro, methylaminocarbonyl and in the 4 position by a group selected from H, methyl and methoxy.

3. A transfer printing sheet according to claim 1 wherein the azo dye conforms to the formula:

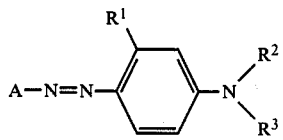

wherein
A is selected from 1-cyanomethyl-4,5-dicyanomidazol-2 yl; 4-cyanoisothiazol-5-yl; 3-methyl-4-cyanoisothiazol-5-yl; 1-cyanomethyl-3,4-dicyanopyrazol-5-yl; pryido(2,3-c)isothiazol-3-yl substituted in the 5, 6 or 5 and 6 positions by a group selected from cyano, nitro, methyl and methoxy; and thien-2-yl, substituted in the 3, 5 or 3 and 5 positions by one or more groups selected from methylaminocarbonyl, cyano and nitro and in the 4 position by a group selected from H, methyl and methoxy;
$R^1$ is selected from H, chloro, $C_{1-4}$-alkyl, $C_{1-4}$-alkylcarbonyl-amino; and
$R^2$ and $R^3$ are each independently selected from H; $C_{1-4}$-alkyl, $C_{1-4}$-alky substituted by a group selected from $C_{1-4}$-alkoxy, $C_{1-4}$-alkoxycarbonyl, $C_{1-4}$-alkylcarbonyloxy, cyano and chloro.

4. A transfer printing process which comprises contacting a transfer sheet coated with a dye according to claim 1 with a receiver sheet, so that the dye is adjacent to the receiver sheet, and selectively heating areas of the transfer sheet to a temperature from >300° C. to 400° C. for a period from 2 to 10 milliseconds whereby dye in the heated areas of the transfer sheet may be selectively transferred to the receiver sheet.

5. A thermal transfer printing sheet according to claim 1 wherein the azo dye is selected from
3-methyl-4-(3-cyanomethyl-4,5-dicyanoimidazol-2-ylazo)-N-n-butyl-N-(3-(methoxycarbonyl)-propyl)-aniline,
3-methyl-4-(1-cyanomethyl-3,4-dicyanopyrazol-5-ylazo)-N-n-butyl-N-(2-(ethoxycarbonyl)ethyl)aniline,
3-methyl-4-(1-cyanomethyl-3,4-dicyanopyrazol-5-ylazo)-N-n-butyl-N-ethyl-aniline,
3-acetylamino-4-(1-cyanomethyl-3,4-dicyanopyrazol-5-ylazo)-N-n-butyl-N-ethylaniline,
3-methyl-4-(1-cyanomethyl-3,4-dicyanopyrazol-5-ylazo)-N,N-diethylaniline,
3-methyl-4-(3-methyl-4-cyanoisothiazol-5-ylazo)-N,N-diethylaniline,
4-(3-methyl-4-cyanoisothiazol-5-ylazo)-N,N-diethylaniline,
4-(3-methyl-4-cyanoisothiazol-5-ylazo)-N-ethyl-N-(2-ethoxyethyl)aniline,
3-methyl-4-(3-methyl-4-cyanoisothiazol-5-ylazo)-N,N-di(2-acetoxyethyl)-aniline,
3-methyl-4-(3-methyl-4-cyanoisothiazol-5-ylazo)-N-n-butyl-N-(2-(ethoxycarbonyl)ethyl)aniline,
3-methyl-4-(3-methyl-4-cyanoisothiazol-5-ylazo)-N-n-ethyl-N-(2-(ethoxy-carbonyl)ethyl)aniline,
3-methyl-4-(3-methyl-4-cyanoisothiazol-5-ylazo)-N-n-ethyl-N-(2-ethoxyethyl)aniline,
3-methyl-4-(3,5-dinitrothien-2-ylazo)-N,N-diethylaniline and
3-methyl-4-(3,5-dicyano-4-methylthien-2-ylazo)-N,N-di(2-acetoxyethyl)aniline.

* * * * *

Notice of Adverse Decision in Interference

In Interference No. 102,270, involving Patent No. 4,764,178, P. Gregory, R. L. White, THERMAL TRANSFER PRINTING: HETERO-AROMATIC AZO DYE, final judgement adverse to the patentees was rendered Jan. 17, 1991, as to claims 1-15.

*(Official Gazette March 5, 1991)*